Inventor
Emmeth A. Luebke
by Allen M. Sutton
His Attorney

Sept. 15, 1964    E. A. LUEBKE    3,149,250
MAGNETOHYDRODYNAMIC INDUCTION DEVICE
Filed Dec. 9, 1960    2 Sheets-Sheet 2
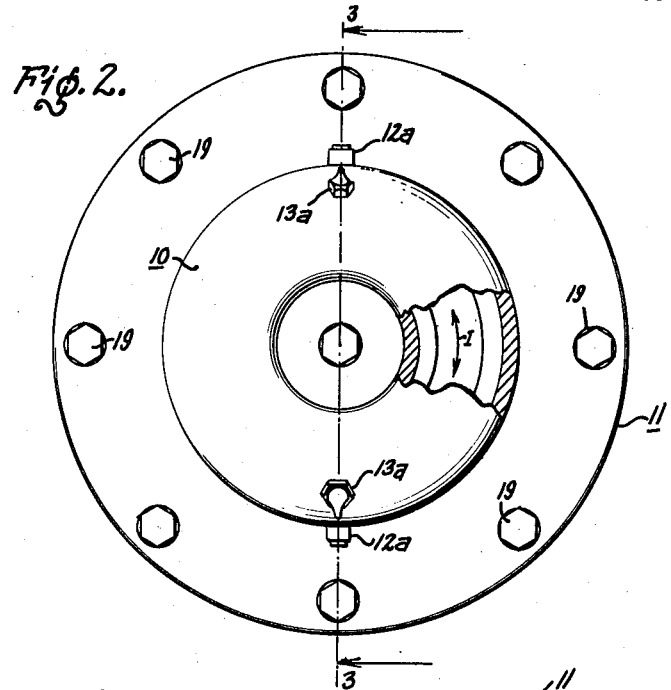
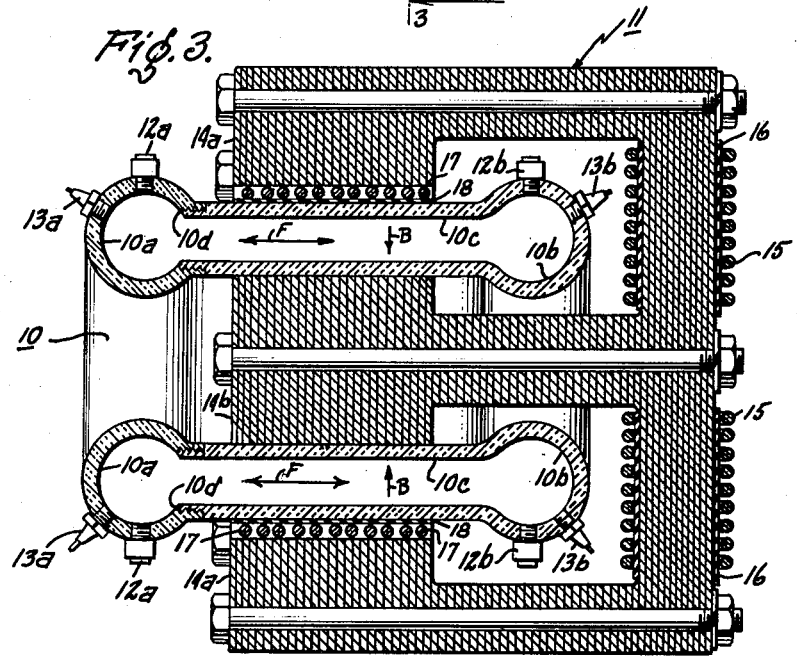
Inventor
Emmeth A. Luebke
by Allen M. Sutton
His Attorney

United States Patent Office 3,149,250
Patented Sept. 15, 1964

3,149,250
MAGNETOHYDRODYNAMIC INDUCTION
DEVICE
Emmeth A. Luebke, Schenectady, N.Y., assignor to General Electric Company, a corporation of New York
Filed Dec. 9, 1960, Ser. No. 75,007
7 Claims. (Cl. 310—11)

This invention relates to apparatus for generating electrical power. More particularly, the invention relates to apparatus for generating alternating current power by the interaction of a moving conducting fluid and a magnetic field.

Conventional rotating devices for generating electricity are based on the principle of first converting heat energy to rotational mechanical energy, typically in a prime mover such as a steam turbine, and then converting the mechanical energy into electrical energy by driving a metallic conductor through a magnetic field. For economical operation of such turbine powered generating systems, high thermal conversion efficiencies in the steam turbine are imperative. The various improvements in turbine efficiencies that have been effected in the past have been achieved by operating at ever higher temperatures and pressures. As these rise, the problems they generate multiply so rapidly that a limit is quickly reached in what may be accomplished by further increases in operating temperatures and pressures. Probably the greatest difficulties arise in the materials area, since the mechanical stresses on moving parts such as turbine blades, shafts, etc., become progressively more severe as operating temperatures and pressures increase. Consequently, a "diminishing returns" effect has set in and improvements in efficiency have been achieved in smaller and smaller increments and at higher and higher costs. Many of these difficulties can be avoided and radical improvements in conversion efficiencies can be effected by completely eliminating those elements which limit performance and try devising a system that does not have any moving mechanical components.

To this end, it has been proposed to generate electricity by abstracting energy from a moving conducting fluid, preferably a gaseous one, as it passes through a magnetic field. By using a fluid conductor in place of a solid one, the conductor may be driven through the magnetic field without employing rotating or moving parts merely by impressing a pressure difference on the fluid. Mechanical prime movers, such as turbines are, therefore, no longer necessary and a generating system without any moving parts is feasible. The body of scientific knowledge dealing with the interaction of a conducting gaseous fluid with a magnetic field is commonly known as magnetohydrodynamics (usually abbreviated to MHD) and all subsequent references in this specification to the generation of electrical power by the interaction of a conducting fluid and a magnetic field will be to magnetohydrodynamic generation of MHD generation.

A typical example of an MHD generating system as conceived by previous workers in the field is described in detail in Patent No. 1,717,413, issued June 18, 1929, to one R. Rudenberg, which contemplates bringing a gas stream to a conducting condition by heating it to a temperature at which it becomes partially ionized. The ionized gas stream is driven through a magnetic field by a pressure difference, causing an electromotive force (E.M.F.) to be generated in the gas. Under the influence of this E.M.F. such charged particles as are present in the gas are deflected to a pair of electrodes causing a unidirectional current to flow through an external load circuit connected to the electrodes.

Electrical energy generated by such an MHD system is unidirectional (i.e., D.C.) and consequently is not immediately useful for most commercial and industrial applications since these usually require alternating current (or A.C.) power. Auxiliary equipment must, therefore, be provided to convert the energy to A.C., a requirement which adds to the complexity and expense of the installation and to the cost per kilowatt-hour of the generated power.

Difficult maintenance problems are also characteristic of these prior art MHD systems because of the rugged environment to which the internal current collecting electrodes are exposed. These electrodes, which are in direct contact with the conducting gaseous medium, are exposed to ambient temperatures of several thousand degrees Kelvin, and hence erode rapidly and must be frequently replaced. By means of applicant's invention all of these difficulties are obviated and an MHD power generating system is provided which generates A.C. power directly, and which dispenses with internal current collecting electrodes and the need for auxiliary D.C. to A.C. conversion equipment.

It is a primary object of this invention, therefore, to provide alternating current magnetohydrodynamic electrical power generating apparatus.

Another object of this invention is to provide an electrodeless magnetohydrodynamic power generating apparatus.

Another object of this invention is to provide an apparatus for subjecting an oscillating conducting fluid to a magnetic field so that alternating power is generated by their interaction.

A further object is to provide an MHD generator of the type wherein the conducting fluid may be re-used continuously.

Other objects and advantages of this invention will become apparent as the description of one embodiment thereof proceeds.

The various objects and advantages of this invention are realized, in one embodiment thereof, by constructing an apparatus in which a conducting gaseous medium is caused to oscillate or surge back and forth through a magnetic field. The interaction of the moving conducting medium with the steady magnetic field produces a circulating current within the conducting medium itself and the circulating current induces a time varying (preferably sinusoidal) output E.M.F. in a load coil around the path of the moving gaseous medium.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIGURE 2 is a plan view of one embodiment of the invention, with a portion broken away; and FIGURE 3 is a sectional view of the generator of FIGURE 2, taken along the lines 3—3.

Figure 1:
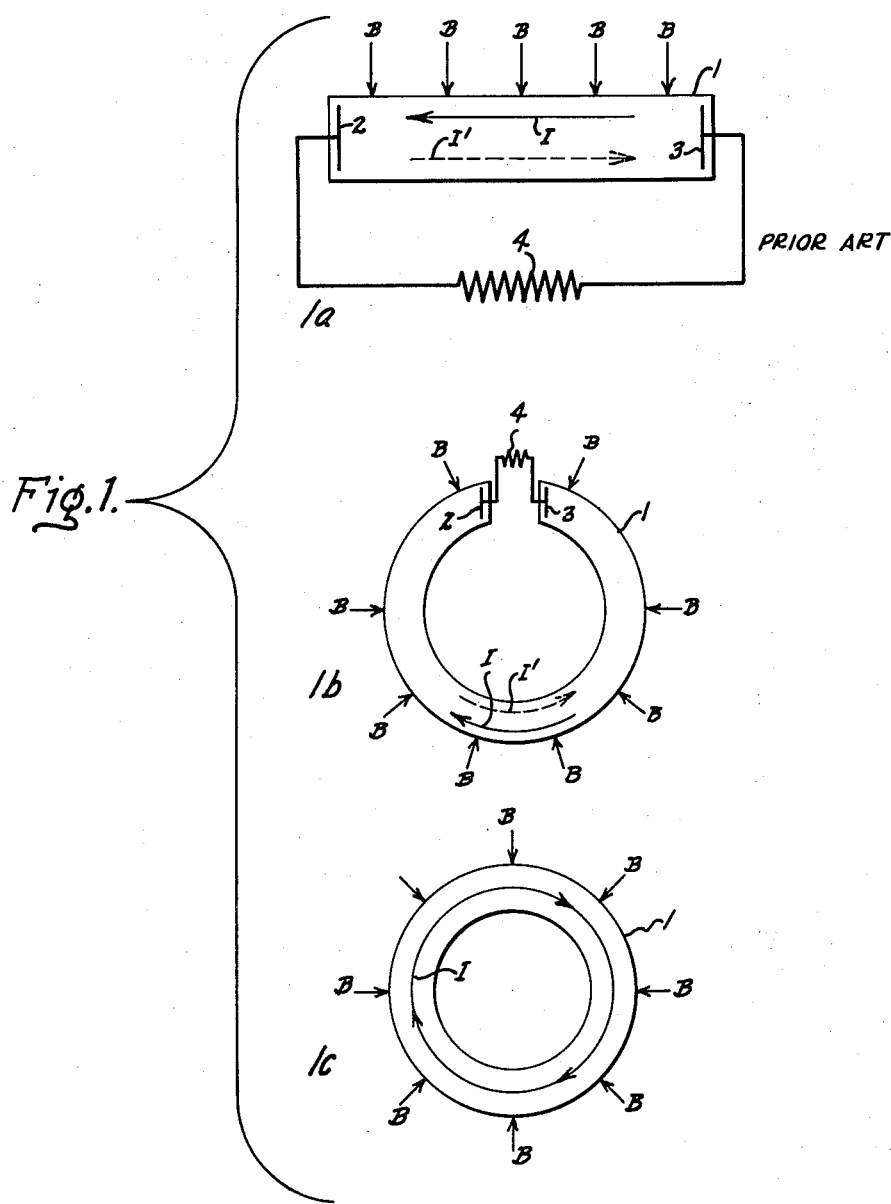
FIGURE 1 is a series of schematic illustrations useful in explaining and understanding the invention.

Before discussing an A.C. MHD generator constructed according to the principles of this invention, it will be useful to discuss some pertinent physical properties of gaseous fluids; the conditions under which they become conducting; and the manner in which this conductive condition may be achieved to facilitate interaction with a magnetic field. The basic properties of pure gases or of gas mixtures, such as air, are such that under normal circumstances of temperature and pressure the conductivity of the gas is so low that for all practical purposes the gas is non-conducting and no interaction with a magnetic field is possible. To achieve any significant results, the conductivity of the gaseous fluid must be increased in some manner. The preferred method of enhancing the gas conductivity is by partially ionizing the gas, causing a fraction of the gas molecules to lose one or more electrons. The resulting charged particles are free to drift through the gas and give rise to current conduction by interaction with a magnetic field.

The gas may be ionized in any one of several ways, as by thermal ionization, electric field ionization, X-ray ionization, arc discharge ionization, etc. Because of the relative ease and effectiveness with which it may be carried out, the preferred method in MHD generating systems is by thermal ionization, i.e., adding heat energy to the gas until some of the gas molecules lose electrons. The thermal ionization process is, however, severely temperature dependent, and is also a discontinuous phenomenon; i.e., there is a critical limiting threshold temperature below which no ionization takes place. The ionization energy, by which is meant the thermal energy increment which must be added to the molecules to initiate ionization and tear loose one or more of its electrons, is quite high for most gases. Common gases, such as air, CO, $CO_2$, as well as noble gases, show no perceptible ionization unless the gas is heated above a threshold temperature of approximately 3500° K. (5800° F.). It will be appreciated that the problems involved in heating the gas to an operating temperature, which must be even higher than the ionization threshold temperature of 3500° K., are substantial both in terms of the magnitude of the effort required to heat the gas and in terms of the problem of finding materials capable of withstanding such temperatures.

Fortunately, these difficulties may be greatly reduced by a technique which substantially lowers the critical threshold temperature for ionization. It has been found that by adding a small amount, in the range of 0.1–1% by volume, of some easily ionizable material, such as an alkaline metal vapor for example, the threshold ionization temperature is reduced by as much as 40–50%.

For example, by "seeding" clean air through the addition of 1% or less by volume of potassium vapor, the critical ionization threshold temperature is reduced from 3500° K. (5800° F.) to 2000° K. (3600° F.). Cesium (Cs), potassium carbonate ($K_2CO_3$), cesium carbonate ($CsCO_3$) are additional examples of alkaline metal vapors or compounds which are effective for this purpose. For a more thorough discussion of electrical conductivity by thermal ionization, reference is hereby made to an article entitled "Electrical Conductivity of Thermally Ionized Air Produced in a Shock Tube," Lamb, Lawrence, and Lynn, Journal of Applied Physics, volume 28, July 1957.

The conducting gas after seeding is in suitable condition for interacting with a magnetic field and, in accordance with the principles of the invention, it is caused to oscillate through a magnetic field of suitable configuration to establish a circulating current entirely within the conducting gas. The manner in which a circulating current is generated within the gaseous fluid and the novel constructional features of the MHD generator may be most easily understood in connection with the schematic illustrations of FIGURES 1a–1c of the accompanying drawings. In FIGURE 1a, a conventional prior art D.C. MHD arrangement is shown as including an elongated rectangular fluid passage or duct 1, extending into the plane of the paper. Metallic electrodes 2 and 3 are disposed in the duct and are connected to a load circuit 4 which, for simplicity of explanation and illustration, is shown as a simple resistance. If the direction of gas flow is into the plane of the paper and a magnetic field of constant flux density is applied at right angles to the direction of flow, as illustrated by the solid arrows labeled B, an E.M.F. is generated in the conducting gas at right angles both to the field and the direction of flow. This E.M.F. acts on the free electrons in the ionized gas and causes an electron current to flow between electrodes 2 and 3 and through load 4 in the direction shown by the solid arrow I. If the direction of gas flow is reversed, the current flow is in the opposite direction as indicated by the arrow I'.

If the rectangular duct 1 shown in FIGURE 1a is bent into the partially closed toroid shown in FIGURE 1b, the interaction of the moving fluid and the magnetic field produces current flow between electrodes 2 and 3 in the direction shown by the arrow I; provided that the magnetic field is at right angles to the direction of fluid flow at all points, i.e., normal to the periphery of duct 1. As can be seen by observation, in order to fulfill this requirement the applied field, as illustrated by the arrows B, must be radial.

Modifying the duct configuration still further, and constructing it in the shape of the closed annulus of FIGURE 1c, establishes a conductive path entirely within the conducting gas and establishes an electrodeless current flow. The interaction of the radial magnetic field B and the gaseous conductor flowing into the annular duct establishes an E.M.F. around the annular path which acts on the electrons and causes a circulating electron current I to flow entirely within the gas. Electrodes 2 and 3 are, therefore, no longer needed to complete the electrical circuit and may be eliminated to produce the electrodeless structure shown in FIGURE 1c.

By a proper combination of duct configuration and a radially shaped magnetic field, a circulating current is established entirely within the gas. The electrodes are no longer needed to complete the current path and may be dispensed with. However, the magnitude and direction of rotation of the circulating current must vary with time so that it may be utilized, as will be discussed presently, to generate alternating power. To this end, the direction of flow of the gas through the annular duct is periodically reversed; i.e., it flows alternately in opposite directions, much in the manner of a piston comprised of hot conducting gas. The magnitude of the circulating current varies correspondingly so that the direction of current flow changes from clockwise to counterclockwise during each cycle. A toroidal magnetic field, which varies in magnitude and direction, links the circulating current and is transported along the duct by the moving fluid. This time varying toroidal magnetic field associated with the current ring may then be used to induce an alternating E.M.F. in suitable output windings. In short, by controlling the direction of gas flow through the annular gas flow path, the direction and magnitude of the induced circulating current is cyclically varied and an alternating E.M.F. is generated.

FIGURES 2 and 3 illustrate diagrammatically one embodiment of an A.C. MHD generator constructed in accordance with the principles of the invention. A flow path for a moving conducting fluid or gas, referred to hereafter as the working gas, is provided by the closed annular duct 10, which includes somewhat enlarged end chambers 10a and 10b, and an annular central portion or interaction space 10c. The annular interaction space 10c is partially surrounded by a magnetic structure, indicated generally at 11 and to be later described, which impresses a radial magnetic field across the interaction space. The end chamber 10a and the annular central portion 10c of the duct may be provided with threads, as at 10d, to facilitate assembly and disassembly of the generator.

Suitable gas or vapor fittings 12a are provided on the outer end 10a of the annular duct, and similar fittings 12b are provided on the inner end 10b of the duct, one purpose of which is to connect to supply lines (not shown) for introducing the working gas into the annular duct 10 and for emptying the duct when it becomes necessary.

The fittings also have another purpose which will be later described in connection with the operation of the apparatus, and in particular with the operation of spark plugs 13a and 13b provided adjacent the fittings 12a and 12b, respectively. Suitable openings may be provided through the magnetic structure 11 to accommodate connections to the fittings 12b and spark plugs 13b.

The interior of the annular duct 10 is, of course, exposed to the hot flowing working gas and must, therefore, be fabricated of a temperature resistant material. Refractory materials such as zirconium oxide, for example, are particularly suitable as lining material. The melting point of refractories such as zirconium oxide is higher than the operating temperatures in the MHD generator and they do not deteriorate on contact with the hot gases. Many other refractory materials having similar temperature resistant properties are available and may be used for this purpose. Thoria, tungsten, and tungsten carbide are a few examples of suitable alternatives for constructing the duct through which the hot gas flows. All of these materials have melting points of approximately 3000° K. or higher so that they do not melt or deteriorate thermally in this application.

Partially surrounding the duct 10 is the magnetic structure 11 previously mentioned, which is excited from a suitable direct current source (not shown) to impress a steady radial magnetic field across the annular interaction space 10c as shown by the arrows designated B in FIGURE 3. The magnetic structure 11 is of laminated iron construction to reduce eddy currents, and includes pole pieces 14a and 14b, between which the interaction space 10c is located, and field producing windings 15. The field producing windings 15 are insulated from the core as at 16, and are energized from the direct current source mentioned above. Also located between the pole pieces 14a and 14b of the magnetic structure is a pick-up or load coil 17 which encircles the annular interaction space 10c of the duct and is suitably heat insulated therefrom by material 18.

The laminated structure 11 is held together by a plurality of nut and bolt combinations 19 that extend from one end to the other so that the entire structure may be easily disassembled.

In operation, the heated gas, which is the working medium of the MHD generator, is introduced into the annular duct 10 through one or more of the fittings 12a and 12b. These fittings are connected through suitable lines (not shown) with a combustor (not shown) or other source of heat, where the gas is brought to the desired temperature. Before being introduced into the duct 10, the heated gas may be "seeded" with an easily ionizable alkaline metal vapor such as potassium (K) or potassium carbonate ($K_2CO_3$) to enhance the gas conductivity at the operating temperature. As will become more apparent later, one of the advantages of the present invention is that the hot gas need not be at its ionizing or working temperature when it enters the annular duct 10 but may be somewhat cooler. After the working gas has entered the duct, the fitting through which it was introduced may be disconnected or otherwise sealed to retain the gas within the duct.

The present invention contemplates that the working gas will be caused to surge or alternately flow in opposite directions back and forth from end to end of the annular duct 10 as shown by the arrows marked F (FIGURE 3). It is to this end that the spark plugs 13a, 13b are provided adjacent the fittings 12a, 12b, which cooperate to act as force producing means. After the working gas is in the annular duct 10 the inlet fittings 12a and 12b are connected to a suitable source (not shown) of combustible material. The combustible material, which should be in either a gaseous or vaporized state, may be any one of a number of substances well known in the art. For example, it may be vaporized gasoline, a mixture of oxygen and hydrogen, acetylene, or other well known gas. The substance utilized should support explosive combustion, but the invention is in no way limited to the use of any specific substance.

The spark plugs 13a at the outer end 10a of the duct are connected to a suitable source of electric energy (not shown) to cause them to fire simultaneously, and the spark plugs 13b at the inner end 10b of the duct are similarly connected, although the plugs 13b do not fire at the same time as the plugs 13a. The electrical source or sources to which the spark plugs 13a and 13b are connected may be of any conventional type well known in the art, such as the usual spark coil and capacitor arrangement. The only criterion is that the device to which they are connected be capable of alternately firing the plugs 13a and 13b at a rate corresponding to the frequency of the A.C. power which is to be generated. For example, if 60 cycle power is to be generated, the plugs 13a and 13b must each fire 60 times per second, alternately.

In operation, after the working gas, which is close to, but not yet at, its ionizing temperature, is confined in the duct 10a, a proper amount of combustible material is introduced into the outer end 10a of the duct through the fittings 12a. The spark plugs 13a adjacent the fittings 12a are then caused to fire. This action has two effects; first the combustion occurring at the end 10a raises the temperature of the working gas and, second, it drives the working gas toward the inner end 10b of the duct. Then, when the same action occurs at the end 10b of the duct, the gas is further heated and driven back toward the outer end 10a of the duct. After several cycles, the working gas is heated to its ionizing temperature, or even superheated, and current flows through the gas as it surges back and forth between the pole pieces 14a and 14b of the magnetic structure 11. The duct 10 being annular in shape provides a closed path in the working gas for the current which flows around the duct in the direction shown by the arrow I in FIGURE 2. Of course, as the gas is alternately driven back and forth between the ends 10a and 10b of the duct, which operate as combustion chambers, the direction of the current flow in the gas reverses. The circulating current establishes, and is accompanied by, its own time varying toroidal magnetic field and hence, may be likened to a moving short-circuited single turn primary winding which comes into flux exchanging relationship with output winding 17 and induces an alternating E.M.F. therein. Of course, the output winding 17 is connected to a suitable load device (not shown) which is to utilize the electric current produced by the MHD generator.

It is now apparent that the hot working gas must be non-combustible, so that where the spark plugs fire the working gas itself will not ignite or explode. Suitable gases are air, carbon dioxide, carbon monoxide, and the rare or noble gases, among others.

It is obvious that many modifications may be made to the embodiment of the invention illustrated. For example, the explosive combustion taking place in the ends 10a and 10b of the annular duct 10 may be by means of fission or thermal nuclear reaction as well as by the electric spark arrangement illustrated and described. Furthermore, it is possible that such explosive combustion need only occur in one end of the annular duct 10 to drive the ionized gas to the other end from which it would be reflected rather than being positively driven back as in the present instance.

A further modification could consist of supplying one or more additional inlets or valves through which the working gas could be introduced and removed from the annular duct 10. In that case, the fittings 12a and 12b could be permanently connected to the source of combustible material.

It is now apparent that the invention attains all of its stated objectives and, in addition, embodies certain outstanding advantages. For example, by virtue of the invention, a serious material problem has been alleviated in that the working gas need not be heated to its ionization temperature before being introduced into the MHD generator. Thus any lack or expense of ultra high temperature materials for heating the gas and conducting it to the apparatus is not a limitation.

An MHD generator is provided for generating A.C. power, which generator utilizes no electrodes in contact with the hot working gas. Thus, the expensive and time consuming problems of electrode replacement is completely eliminated. Furthermore, the working gas can be reused continuously and merely augmented from time to time as necessary. Complete change of the gas is required only infrequently.

It will be obvious to those skilled in the art that many variations and modifications of the apparatus may be made without departing from the spirit and scope of the invention, and this invention is to be considered as limited only by the scope of the appended claims.

What I claim as new and desire to secure by Letters Patent of the United States is:

1. In a magnetohydrodynamic device for generating alternating current, the combination comprising means defining an annular flow passage for a conductive fluid, said flow passage being closed at both ends, magnetic means disposed about said annular flow passage for impressing a steady radial magnetic field across said flow passage, means associated with said flow passage for causing the conducting fluid to flow alternately in opposite directions through said magnetic field to establish a varying circulating current within the moving fluid by the interaction of said field and the fluid, and coil means adapted to have an alternating electromotive force induced therein by the varying circulating current in the fluid.

2. In a magnetohydrodynamic device for generating alternating current, the combination comprising means defining an annular flow passage for a conductive fluid, said flow passage being closed at both ends, magnetic means disposed about said annular flow passage for impressing a steady radial magnetic field across said flow passage at right angles to the direction of flow, means associated with said flow passage for causing the conducting fluid to flow alternately in opposite directions through said magnetic field to establish a varying circulating current within the moving fluid by the interaction of said field and the fluid, and coil means adapted to have an alternating electromotive force induced therein by the varying circulating current in the fluid.

3. In a magnetohydrodynamic device for generating alternating current, the combination comprising means defining an annular flow passage for a conductive fluid, said flow passage being closed at both ends, magnetic means disposed about said annular passage for impressing a steady radial magnetic field across said flow passage, means associated with at least one end of said flow passage for causing the conducting fluid to flow alternately in opposite directions through said magnetic field to establish a varying circulating current within the moving fluid by the interaction of said field and the fluid, and coil means adapted to have an alternating electromotive force induced therein by the varying circulating current in the fluid.

4. In a magnetohydrodynamic device for generating alternating current, the combination comprising means defining an annular flow passage for a conductive fluid, said flow passage being closed at both ends, magnetic means disposed about said annular flow passage for impressing a steady radial magnetic field across said flow passage, force producing means associated with both said closed ends of said flow passage for causing the conducting fluid to flow alternately in opposite directions through said magnetic field to establish a varying circulating current within the moving fluid by the interaction of said field and the fluid, and coil means adapted to have an alternating electromotive force induced therein by the varying circulating current in the fluid.

5. In a magnetohydrodynamic device for generating alternating current, the combination comprising an annular flow passage for a conductive fluid, said annular flow passage being closed at both ends, at least one of said ends constituting a combination chamber, magnetic means disposed about said annular flow passage for impressing a steady radial magnetic field across said flow passage, means for producing explosive combustion in said combustion chamber for causing the conducting fluid to flow alternately in opposite directions through said magnetic field to establish a varying circulating current within the moving fluid by the interaction of said field and the fluid, and coil means adapted to have an alternating electromotive force induced therein by the varying circulating current in the fluid.

6. In a magnetohydrodynamic device for generating alternating current, the combination comprising an annular flow passage for a conductive fluid, said annular flow passage being closed at each end by a combustion chamber, magnetic means disposed about said annular flow passage for impressing a steady radial magnetic field across said flow passage, means for producing explosive combustion alternately in said combustion chambers for causing the conducting fluid to flow alternately in opposite directions through said magnetic field to establish a varying circulating current within the moving fluid by the interaction of said field and the fluid, and coil means adapted to have an alternating electromotive force induced therein by the varying circulating current in the fluid.

7. In a magnetohydrodynamic device for generating alternating current, the combination comprising a closed annular flow passage for a conductive fluid, said annular flow passage being closed at each end by a combustion chamber and having an interaction space separating said combustion chambers, magnetic means disposed about said interaction space for impressing a steady radial magnetic field across said interaction space, means for producing explosive combustion alternately in said combustion chambers for causing the conducting fluid to flow alternately in opposite directions through said interaction space to establish a varying circulating current within the moving fluid by the interaction of said magnetic field and the fluid, and coil means associated with said interaction space and adapted to have an alternating electromotive force induced therein by the varying circulating current in the fluid.

References Cited in the file of this patent

UNITED STATES PATENTS

| | | |
|---|---|---|
| 1,717,413 | Rudenberg | June 18, 1929 |
| 1,916,076 | Rupp | June 27, 1933 |
| 2,850,652 | Stanton | Sept. 2, 1958 |
| 2,997,641 | Baker et al. | Aug. 22, 1961 |

FOREIGN PATENTS

| | | |
|---|---|---|
| 738,511 | Great Britain | Oct. 12, 1955 |

OTHER REFERENCES

Publication: Plasma Reactor Promises, by Colgate et al., Nucleonics, August 1957, pages 50 to 54.